US009353717B2

(12) United States Patent
Rinze et al.

(10) Patent No.: US 9,353,717 B2
(45) Date of Patent: May 31, 2016

(54) ENGINE CONTROL UNIT FOR DRIVING AN ELECTRIC CIRCUIT AND METHOD

(75) Inventors: Lars-Daniel Rinze, Kornwestheim (DE); Uwe Surges, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 806 days.

(21) Appl. No.: 13/583,188

(22) PCT Filed: Feb. 9, 2011

(86) PCT No.: PCT/EP2011/051884
§ 371 (c)(1),
(2), (4) Date: Nov. 15, 2012

(87) PCT Pub. No.: WO2011/110397
PCT Pub. Date: Sep. 15, 2011

(65) Prior Publication Data

US 2013/0057065 A1 Mar. 7, 2013

(30) Foreign Application Priority Data

Mar. 9, 2010 (DE) ........................ 10 2010 002 678

(51) Int. Cl.
*B60R 22/00* (2006.01)
*F02P 9/00* (2006.01)
*H02G 3/00* (2006.01)
*F02N 11/08* (2006.01)
(Continued)

(52) U.S. Cl.
CPC .............. *F02N 11/08* (2013.01); *F02N 11/101* (2013.01); *F02N 11/108* (2013.01); *F02D 41/22* (2013.01); *F02N 11/087* (2013.01); *F02N 2011/0874* (2013.01); *F02N 2300/30* (2013.01)

(58) Field of Classification Search
CPC ....... F02N 11/08; F02N 11/87; F02N 11/101; F02N 11/108; F02N 2300/30; F02N 2011/0874; F02D 41/22
USPC ........................................................ 307/10.6
See application file for complete search history.

(56) References Cited

U.S. PATENT DOCUMENTS

| | | | | |
|---|---|---|---|---|
| 2007/0008666 | A1 * | 1/2007 | Morita et al. | 361/42 |
| 2008/0210187 | A1 * | 9/2008 | Sugano et al. | 123/179.3 |
| 2008/0212254 | A1 * | 9/2008 | Arndt et al. | 361/194 |

FOREIGN PATENT DOCUMENTS

| | | |
|---|---|---|
| CN | 1172520 | 2/1998 |
| CN | 101069013 | 11/2007 |

(Continued)

OTHER PUBLICATIONS

International Search Report for PCT/EP2011/051884, dated Oct. 28, 2011.

*Primary Examiner* — Rexford Barnie
*Assistant Examiner* — Toan Vu
(74) *Attorney, Agent, or Firm* — Norton Rose Fulbright US LLP

(57) ABSTRACT

An engine control unit for driving an electric circuit, e.g., a starter in a vehicle, includes at least a first element for making a first signal, particularly an ignition signal, available, a second element for making a voltage available for the electric circuit, a third element for connecting the electric circuit, a first switch which is disposed between the second and third elements to control the electric circuit, and a fourth elements for generating a second signal, the first signal cooperating with the second signal to form a virtual second switch for turning the electric circuit on or off with the aid of the first switch.

18 Claims, 3 Drawing Sheets

(51) Int. Cl.

| | |
|---|---|
| ***F02N 11/10*** | (2006.01) |
| *F02D 41/22* | (2006.01) |

(56) References Cited

FOREIGN PATENT DOCUMENTS

| | | |
|---|---|---|
| CN | 101255842 | 9/2008 |
| DE | 44 02 115 | 1/1995 |
| DE | 195 32 484 | 8/1996 |
| DE | 196 165 43 | 10/1997 |
| DE | 10 2004 031306 | 1/2006 |
| DE | 10 2008 012343 | 9/2008 |
| EP | 1 621 766 | 2/2006 |
| JP | 2001-115936 | 4/2001 |
| JP | 2006-29191 | 2/2006 |
| JP | 2008-248880 | 10/2008 |
| WO | WO 2006/058866 | 6/2006 |
| WO | WO2009024706 | 2/2009 |

* cited by examiner

ENGINE CONTROL UNIT FOR DRIVING AN ELECTRIC CIRCUIT AND METHOD

BACKGROUND OF THE INVENTION

1. Field of the Invention

The present invention relates to an engine control unit for driving an electric circuit, particularly a starter in a vehicle.

2. Description of the Related Art

Engine control units are employed in automotive engineering and are used there for controlling engine components, e.g., a starter of the engine or a fuel pump. Via inputs and outputs, corresponding engine components are able to be connected to the engine control unit in order to control them. For example, the battery voltage is applied via a first input of the engine control unit, and via a second input, a signal may be made available, e.g., an ignition signal, which then actuates corresponding switches within the engine control unit, so that ultimately the starter or the fuel pump is able to be energized, and the engine is then started by the switching-on of the starter and the fuel pump.

The switches are usually either connected on one side to the positive pole of the battery voltage, and after a suitable signal of the microcontroller, switch a starter relay, etc., to ground. Such switches are known as high-side switches. However, there is also the opposite case, in which what is termed a low-side switch connects the starter relay or the fuel-pump relay to the negative pole of the battery voltage.

To allow detection of faults in the electric circuits during operation of a vehicle, e.g., short circuits of the starter to negative or ground, published German patent document DE 196 165 43 C1 or published German patent application document DE 44 02 115 A1 have described suitable devices having special circuitry or engine control units that permit fault detection of short circuits.

Moreover, in order to increase safety with respect to faults, especially with respect to short circuits when starting vehicles, it has become known to provide both a high-side and a low-side switch. The operating principle is as follows: In the engine control unit, a high-side switch is provided that is connected on one side to the battery voltage, and on the other side, to a first output of the engine control unit. The high-side switch is driven via a microcontroller of the engine control unit. Also provided in the engine control unit is a low-side switch which is connected to an output of the engine control unit—the output being connected to ground—and to a second input. Connected between the first output and the second input of the engine control unit is a relay for the starter, which energizes the electric circuit of the starter only when both the high-side and the low-side switch are switched on, that is, are conductive. Therefore, in response to a short circuit of an individual switch, the electric circuit of the starter is not supplied with current, thereby increasing safety, since it is undesirable for a starter or a fuel pump to start up in uncontrolled manner.

However, there is a trend to minimize the weight of cables, etc., in order to keep the overall weight of the vehicle as low as possible. Therefore, in practice, either the high-side switch or the low-side switch is often short-circuited. This saves on weight, since it is possible to dispense with additional cable for the connection of the relay to the second input of the engine control unit. In the case of the short circuit of the high-side switch, the relay of the starter is thus connected directly to the battery voltage; in the case of the short circuit of the low-side switch, the relay of the starter is connected directly to ground. It may be that there are thus savings in cable and weight; however, the likelihood that the starter will switch on in uncontrolled fashion is consequently increased, since in each case, a relay only opens or closes the electric circuit of the starter with one switch.

BRIEF SUMMARY OF THE INVENTION

The engine control unit for driving an electric circuit, e.g., a starter in a vehicle, as well as the corresponding method have the advantage that safety against an unintentional closing of the electric circuit due to a short circuit is increased, and at the same time, the number of connections necessary for this purpose is further reduced, which substantially decreases the costs over all, while maintaining safety. In the same way, the likelihood of a false connection of the electric circuit is reduced, since only one output is available for the respective electric circuit.

According to one preferred further development of the invention, the first and second means include an input of the engine control unit, and the third means includes an output of the engine control unit. The advantage in this connection is that the engine control unit is able to be integrated into electric circuits of vehicles in an inexpensive and uncomplicated manner, and the signals are then able to be made available.

According to a further preferred development, at least one third switch is disposed between the first switch and an output of the engine control unit in order to control a second electric circuit, especially for a fuel pump. The advantage in this context is that not just one electric circuit, particularly the electric circuit for the starter, is able to be switched via the engine control unit, but also, independently of that, further electric circuits, e.g., for a fuel pump, sensors for monitoring, ignition coils, etc., as well. The number of engine control units needed is thus reduced to a minimum. The same holds true for the number of cables, etc., for driving the electric circuits. Likewise, the maintenance and the replacement of the engine control unit is simplified, since in the event of damage or malfunction, the entire engine control unit may simply be replaced.

According to a further preferred refinement, the engine control unit includes a device, particularly a microcontroller, for controlling at least the third switch. This offers the advantage that the device may be used not only for controlling the third switch, but rather, the device may likewise be used to monitor electric circuits which are connected to the engine control unit.

According to another preferred development, the engine control unit includes at least one device for detecting faults. The advantage here is that both faults within the engine control unit as well as faults in the electric circuits connected to the outputs of the engine control unit, e.g., in the case of the starter, sensors, etc, are able to be detected. The device for detecting faults first of all detects these faults and, in so far as a differentiation of the various faults is not possible, checks, based on further tests, e.g., by opening and closing different electric circuits and/or by applying different voltages within a small time window, which faults are present in detail. The faults are then stored in a fault memory, so that they are then able to be read out, for example, by connecting an external diagnostic tool. Likewise, it is possible for the documented fault to be signaled on a display device for a driver of a vehicle, so that the driver can go to an auto repair shop and have the fault rectified.

According to another preferred refinement, the at least one device for detecting faults includes at least one analog-to-digital converter. The advantage in this case is that the prevailing status of the switch or electric circuit to be monitored is able to be picked off in an easy manner. By setting suitable tolerance threshold values, the device, with the aid of the analog-to-digital converter, e.g., with the help of a software running on it, is then able to analyze different analog levels and to detect and document the prevailing status of the electric circuit to be monitored.

According to a further preferred development, the fourth means includes a low-side output stage, in particular, a starter output-stage component, e.g., an R2S2. The advantage in this context is that the use in particular of a specially developed low-side output stage is possible even at low voltages, particularly less than 5V during the starting procedure of an engine, during which the voltage drops very sharply for a brief period. In this manner, the reliability of the engine control unit is increased overall.

According to another preferred refinement, the device for controlling at least the third switch includes detection of faults of the fourth means. This offers the advantage that costs may thereby be reduced, since the device both controls the third switch and detects faults of the fourth means. Consequently, the highest possible integration of the control components and monitoring components of the engine control unit is achieved.

DETAILED DESCRIPTION OF THE INVENTION

Figure 1:
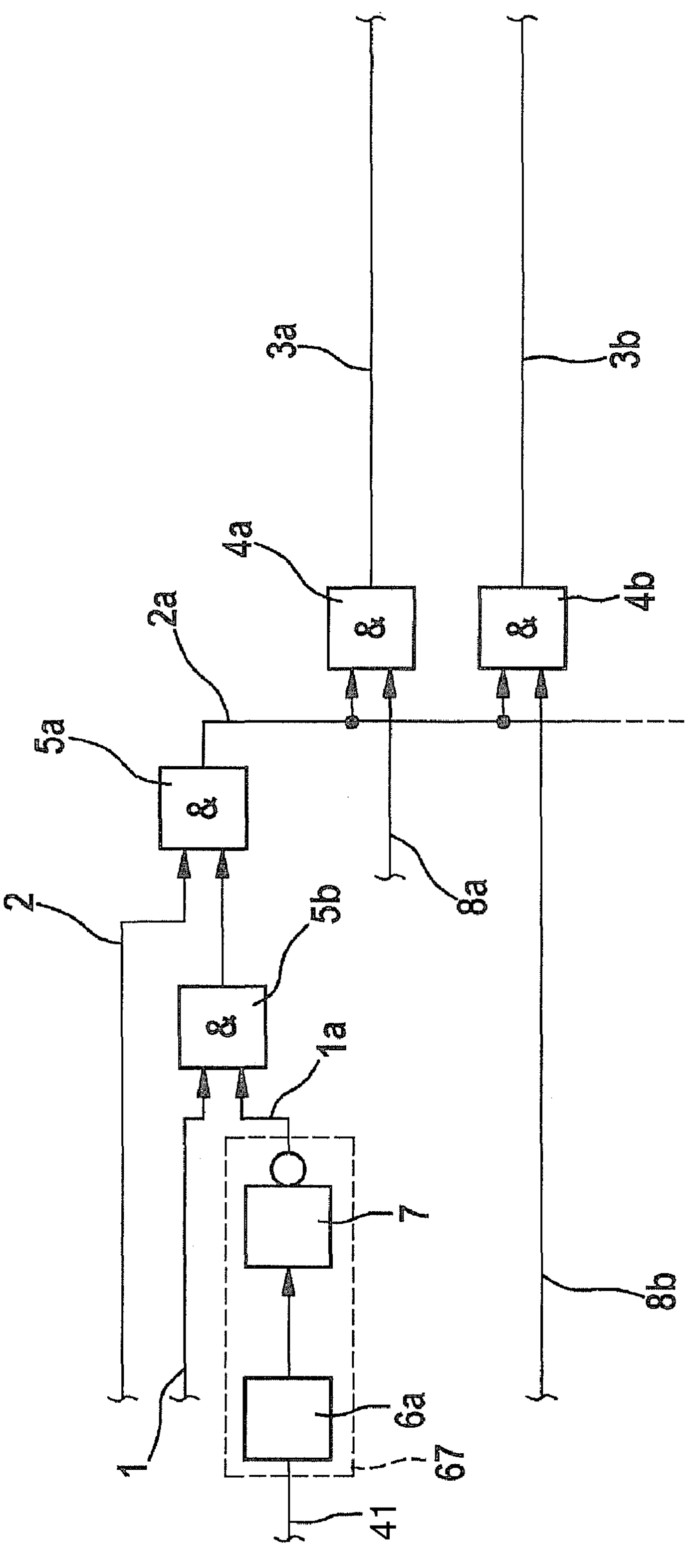
FIG. 1 shows, in simplified manner, an engine control unit for driving an electric circuit according to a first specific embodiment of the present invention, in symbolic logic representation.

In the figures, identical reference numerals denote the same or functionally-equivalent elements.

FIG. 1 shows, in simplified manner, an engine control unit for driving an electric circuit according to a first specific embodiment of the present invention, in symbolic logic representation. In FIG. 1, reference numeral 1 denotes a first signal which is applied to a first input of engine control unit V (see FIG. 2) according to the first specific embodiment. A module 67, including a low-side output-stage component 6*a* in the form of a starter output-stage component, for example, particularly an R2S2 output-stage component, and an inverter 7 downstream of output-stage component 6*a*, provides a second signal 1*a*.

First signal 1 and second signal 1*a* cooperate in such a way that a virtual second switch 5*b* is formed. Virtual second switch 5*b* is in the form of an AND gate. The output of this virtual second switch 5*b* is connected to a first switch 5*a* in order to control this first switch 5*a*. A further signal 2, here in the form of battery voltage 2, is applied to first switch 5*a*. If second switch 5*b* is closed, i.e., a corresponding signal is present at the output of second switch 5*b*, first switch 5*a* is switched in such a way that battery voltage 2 is then also applied to a line 2*a* that is connected to the output of switch 5*a*.

Starting from first switch 5*a*, further switches 4*a*, 4*b* are connected to line 2*a* and make battery voltage 2 available for external loads or electric circuits 3*a*, 3*b*, e.g., a starter or a fuel pump, via corresponding connections, so that they are energized. Switches 4*a*, 4*b* are likewise in the form of logic AND gates. Switch 4*a* is additionally connected to a line 8*a*, and switch 4*b* is connected to a line 8*b*. Via lines 8*a*, 8*b*, in each case a signal, e.g., from a microcontroller 10 (see FIG. 2), is made available, that actuates switches 4*a*, 4*b* and controls electric circuits 3*a*, 3*b*.

Figure 2:
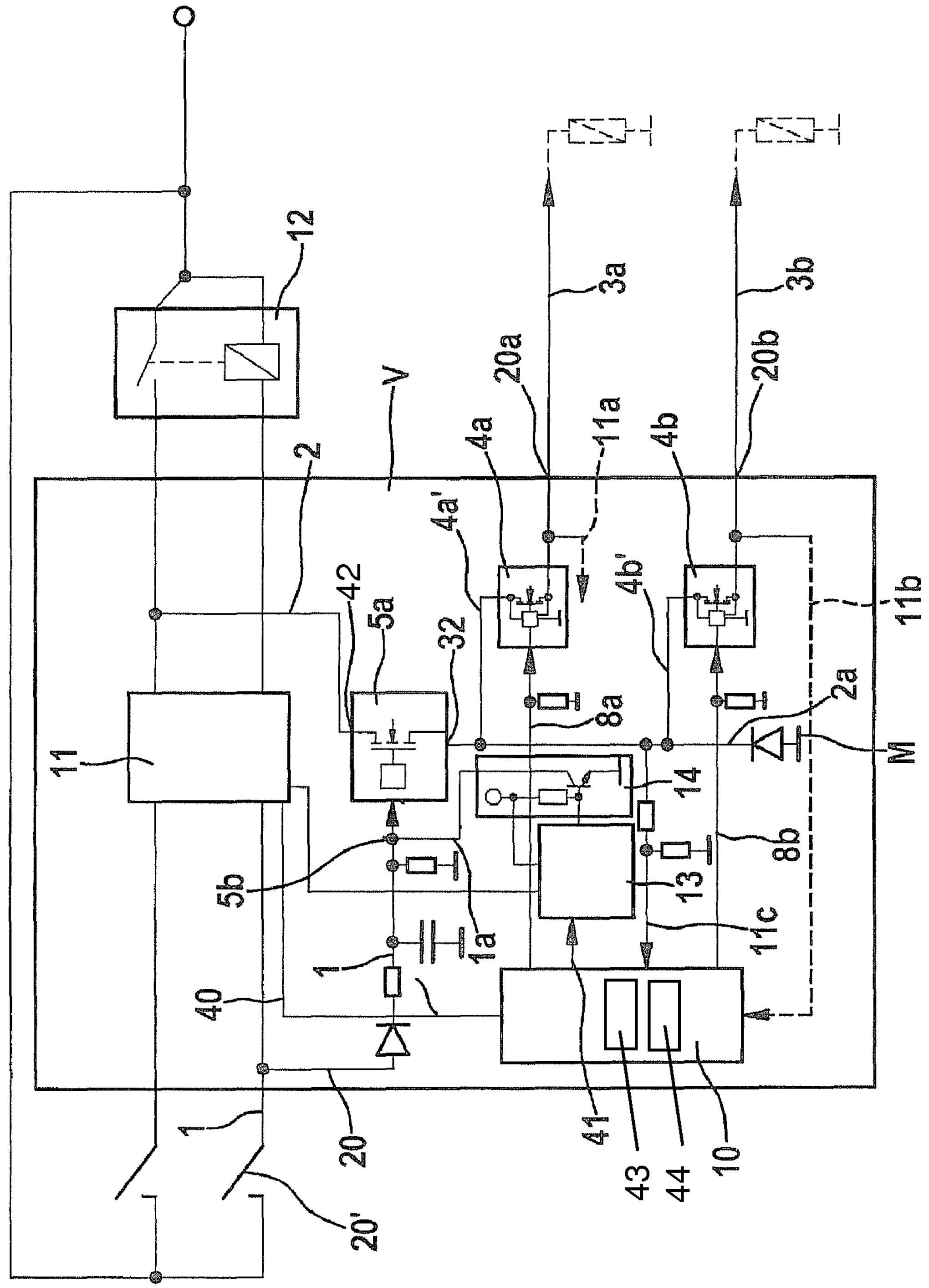
FIG. 2 shows an engine control unit for driving an electric circuit according to a first specific embodiment of the present invention, in a circuit diagram.

FIG. 2 shows an engine control unit for driving an electric circuit according to the first specific embodiment of the present invention in a circuit diagram.

An engine control unit V according to the first specific embodiment is shown in a circuit diagram in FIG. 2. A first signal 1 is applied to a first input 20 of engine control unit V when a switch 20' is closed, e.g., by turning an ignition key of a vehicle, in order to start the vehicle. A primary relay 12 is thereby actuated, so that in a line 2, a battery voltage is then applied to a first switch 5*a* on the input side. The input side of the first switch 5*a* is provided at 42. At the same time, a microcontroller 10 receives a signal from a voltage regulator chip 11, connected to it via a line 40, which in turn detects that first signal 1 is being applied to engine control unit V. Microcontroller 10 then switches on a module 13, 14 via a line 41, reference numeral 13 (in FIG. 1: 6*a*) denoting an output-stage component (low-side output stage, particularly starter output-stage component R2S2) and reference numeral 14 (in FIG. 1: 7) denoting an inverter in the form of a transistor. Module 13, 14 (in FIG. 1: 67) generates an outgoing signal 1*a*. Signals 1 and 1*a* then cooperate in such a way that a virtual second switch 5*b* is formed, which is used to control first switch 5*a*. Second switch 5*b* controls first switch 5*a* in such a way that first switch 5*a* is only switched on in response to the application of a signal 1 and simultaneously upon the application of corresponding signal 1*a* of module 13, 14, so that the battery voltage is then made available at 32 and available in an electric circuit or at line 2*a* that is connected to the output 32 of switch 5*a*.

Lines 4*a'* and 4*b'*, respectively, in turn branch off from this electric circuit 2*a* or line 2*a* to switches 4*a*, 4*b*, which supply voltage to electric circuits 3*a*, 3*b*, connected to engine control unit V at outputs 20*a*, 20*b*, for a starter relay of the engine of a vehicle, for example, or a fuel pump, when corresponding switch 4*a*, 4*b* is closed. In order to control switches 4*a*, 4*b*, in each case a control line 8*a*, 8*b* is provided between microcontroller 10 and respective switch 4*a*, 4*b*. For example, in order to start the engine, microcontroller 10 then controls both the starter by closing switch 4*a*, as well as the fuel pump with the aid of switch 4*b*, if they are connected to engine control unit V via corresponding lines 3*a*, 3*b*.

Between the outputs of switches 4*a*, 4*b* and outputs 20*a*, 20*b* of engine control unit V for the connection of electric circuits 3*a*, 3*b*, diagnostic lines 11*a*, 11*b* are disposed, which are connected to corresponding inputs of microcontroller 10. Finally, also connected to electric circuit 2*a* is a diagnostic line 11*c*, which is likewise connected to an input of microcontroller 10. These diagnostic lines 11*a*, 11*b*, 11*c* are used to detect, differentiate and document faults in engine control unit V, as well as faults in electric circuits 3*a*, 3*b* connected via corresponding lines. For example, these faults are documented in a fault memory 43 of microcontroller 10, which is provided with an external connection for a diagnostic tool. The faults are diagnosed with the aid of analog-to-digital converters 44 in microcontroller 10. A software which runs on microcontroller 10 then ascertains the specific faults on the basis of various tolerance threshold values for the voltage which is made available via lines 11*a*, 11*b*, 11*c*.

The faults are diagnosed with the aid of analog-to-digital converters in microcontroller 10. A software which runs on microcontroller 10 then ascertains the specific faults on the basis of various tolerance threshold values for the voltage which is made available via lines 11*a*, 11*b*, 11*c*.

Using an engine control unit V according to a first specific embodiment as an example, in the following, the detection by engine control unit V of an internal fault of engine control unit V (FIG. 3*a*) as well as a fault in an external electric circuit (FIG. 3*b*) is described exemplarily.

Figure 3A:
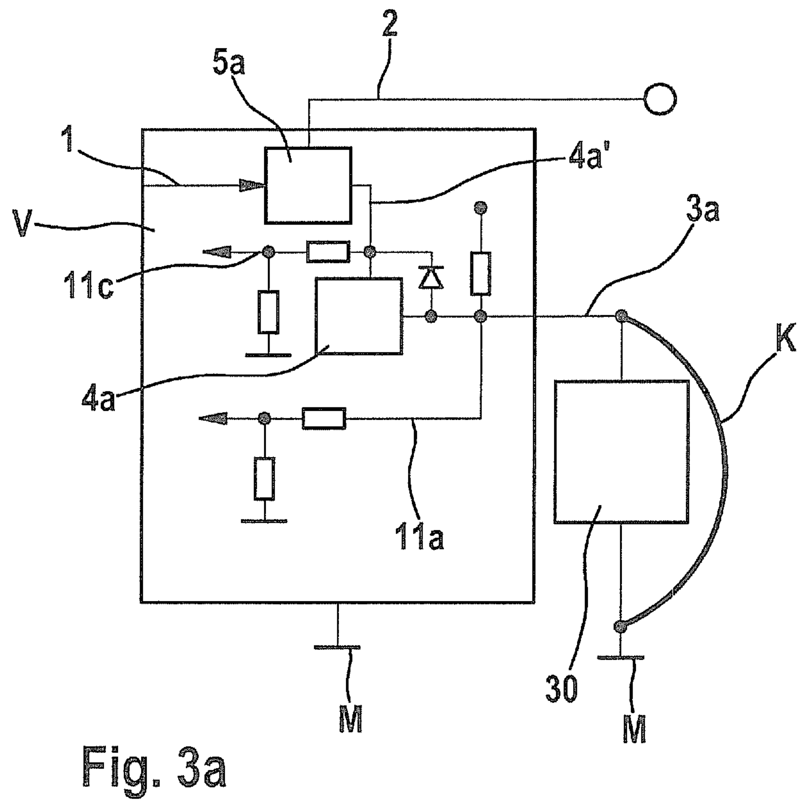
FIG. 3*a* shows an engine control unit for driving an electric circuit in a simplified circuit diagram.

FIG. 3*a* shows a simplified representation according to FIG. 2, having a first switch 5*a* and a second switch 4*a* that controls a starter relay 30 of a vehicle via a line 3*a*. A diagnostic line 11*a* for second switch 4*a* as well as a diagnostic line 11*c* for first switch 5*a* are also shown. Diagnostic lines 11*a*, 11*c* are connected to a microcontroller (not shown here) in a manner corresponding to the setup in FIG. 2, and tap off a voltage at the output of respective switch 4*a*, 5*a* in order to detect faults of engine control unit V or of the electric circuit for starter relay 30.

First of all, a fault-free state, that is, without the bridging of starter relay 30 by short circuit K, is described.

During normal operation of a vehicle, switch 5*a* is closed, that is, the battery voltage is applied to downstream line 4*a*'. However, switch 4*a* which controls a starter relay 30 is out of circuit, i.e., the battery voltage is not applied to line 3*a*. Accordingly, in diagnostic line 11*c*, an analog-to-digital converter measures a voltage which lies above a specific tolerance threshold value A, since switch 5*a* is closed. If switch 5*a* were out of circuit, a voltage below tolerance threshold value A would be measured.

With switch 4*a* out of circuit, it cannot be ascertained with the aid of diagnostic line 11*a*—to which a 5V diagnostic voltage is applied in order to diagnose faults—whether a short circuit K of starter relay 30 is present. In order to now ascertain whether a short circuit K exists, switch 4*a* is closed for a very brief time, and at least the voltage in diagnostic line 11*a* is measured by an analog-to-digital converter in microcontroller 10. A fault-free operation is determined if an impedance of electric circuit 3*a*, connected via diagnostic line 11*a*, lies above a certain tolerance threshold value B for specific DC and AC voltages. In the event of a short circuit K, a smaller voltage value or an impedance less than tolerance threshold value B for the specific DC and AC voltages is determined in diagnostic line 11*a*, so that a short circuit K to ground M is then ascertained correspondingly. In this case, microcontroller 10 then controls switch 4*a* and switch 5*a* accordingly, so that they are closed and/or opened correspondingly in order to permit an analysis or repair of short circuit K. In the case of starter relay 30, both switch 4*a* and switch 5*a* may then be switched off, in order to prevent starter relay 30 from spinning.

Figure 3B:
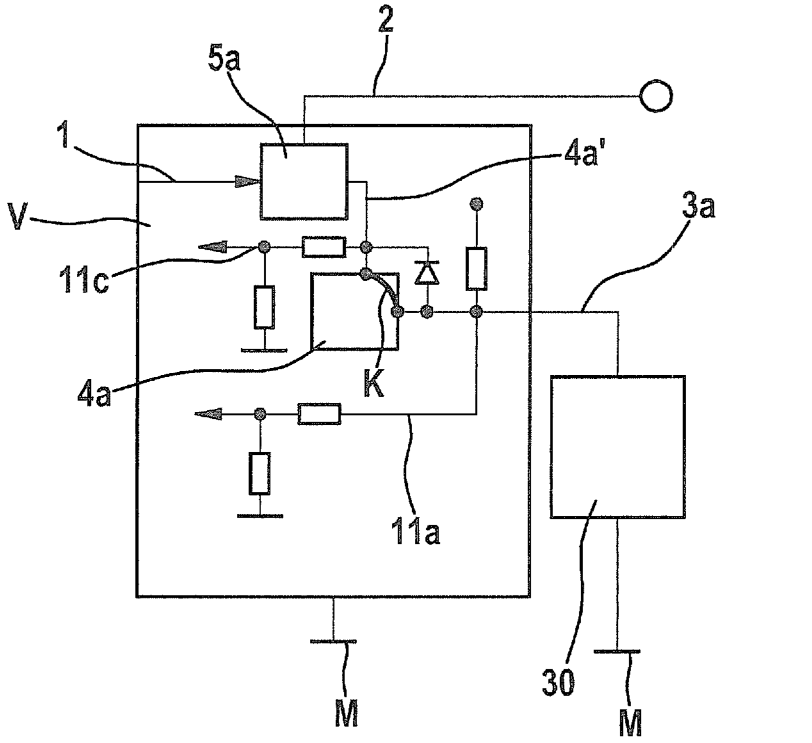
FIG. 3*b* shows an engine control unit for driving an electric circuit in a simplified circuit diagram for the case of a short circuit.

FIG. 3*b*, with the aid of a simplified diagram according to FIG. 2, now shows schematically a case of a short circuit K in switch 4*a*. Without a short circuit K, given switch 4*a* in the OFF state and switch 5*a* in the ON state, a voltage above corresponding tolerance threshold value A is measured in diagnostic line 11*c*, while only the usual voltage is measured in diagnostic line 11*a* in the case of switch 4*a* in the OFF state.

If switch 4*a* is now bridged by a short circuit K, a direct connection then exists between the output of switch 5*a* and electric circuit 3*a* of starter relay 30.

If the engine is started, at first no fault is diagnosed, since for its starting, both switch 5*a* and switch 4*a* must be closed in order to actuate the starter. However, if, because of a successful starting procedure of the engine, switch 4*a* is then turned off so that the starter does not spin, or if the engine is already in the running operating state, but the same voltage as in the closed state is nevertheless still measured in corresponding diagnostic line 11*a*, microcontroller 10 then determines an internal fault of engine control unit V and, if indicated, then turns switch 5*a* off in order to avoid further damage to engine control unit V or connected electric circuit 3*a*.

Ascertainment and differentiation of further internal and external faults, e.g., a short circuit of the starter motor with the battery voltage, an interruption of line 3*a* outside of engine control unit V or perhaps a short circuit of switch 5*a* are also possible with the aid of diagnostic lines 11*a*, 11*c* or microcontroller 10. In order to differentiate the individual faults from each other, in addition, switch 4*a* and switch 5*a* may then be turned on and off reciprocally by the engine control unit, in order to detect and differentiate the various types of faults.

A separate line to the starter or a short circuit to the battery are measured, for example, via diagnostic lines 11*a*, 11*c* in the OFF state of switch 4*a*, whereas a short circuit to ground M is measured during the ON state of switch 4*a*. In the case of an interruption of a line in connected electric circuit 3*a*, for instance, the impedance of the connected electric circuit is ascertained with the aid of diagnostic line 11*a*. If the impedance is above a specific tolerance threshold value C, e.g., several hundred kiloohm, an interruption is detected as fault. If the impedance lies below a specific tolerance threshold value D, e.g., a few kiloohm, no fault is detected by microcontroller 10. Tolerance threshold value D is specified commensurate with typical resistance values of the connected electric circuit.

Moreover, certain faults must be checked continuously by engine control unit V. For example, a fuel pump connected to engine control unit V should be prevented from delivering fuel unchecked by bridging a switch 4*a*—via which a fuel pump is connected—by a short circuit. In this case, switch 4*a* and switch 5*a* are then turned off within 500 ms, if a corresponding fault is detected.

Furthermore, after a first determination of a fault, it is necessary to verify the fault again within a fixed time span in order, for example, to likewise detect a short circuit K on the basis of a cable that is loose and flapping around, and then to turn off switch 4*a* and switch 5*a* in order to avoid damage to the device and to the external electric circuits.

Although the present invention was described above on the basis of preferred exemplary embodiments, it is not limited to them, but rather is modifiable and alterable in many ways.

What is claimed is:

1. An engine control unit for controlling an electric circuit of a starter in a vehicle, the engine control unit comprising:

a first unit for providing a first signal in the form of an ignition signal;

a second unit for providing a voltage for the electric circuit;

a third unit for connecting the electric circuit;

a first switch disposed between the second unit and the third unit in order to control the electric circuit; and a fourth unit for generating a second signal, wherein the first signal cooperates with the second signal to form a virtual second switch for selectively turning the electric circuit on or off with the aid of the first switch;

wherein at least one of:

(i) the fourth unit includes a low-side output stage component;

(ii) the connecting of the electric circuit by the third unit is to the first switch, and the engine control unit is configured for the first switch to provide the voltage from the second unit to the electric circuit via the third unit responsive to the presence on a line of a combination of both the first signal and the second signal, the voltage not being provided by the first switch to the electric circuit when either of the first signal and the second signal is not present on the line; and (iii) the cooperation of the first and second signals is by an arrangement of the engine control unit to logically combine the first and second signals such that the first switch is switched on to provide the voltage to the electric circuit only if the first and second signals are both active.

2. The engine control unit as recited in claim 1, wherein the first and second units include an input of the engine control unit, and the third unit includes an output of the engine control unit.

3. The engine control unit as recited in claim 1, wherein at least one third switch is disposed between the first switch and an output of the engine control unit in order to control a second electric circuit for a fuel pump.

4. The engine control unit as recited in claim 1, wherein a microcontroller is provided to control at least one third switch.

5. The engine control unit as recited in claim 1, wherein at least one device is provided for detecting faults.

6. The engine control unit as recited in claim 5, wherein the at least one device for detecting faults includes an analog-to-digital converter.

7. The engine control unit as recited at least in claim 5, wherein faults of at least one of the engine control unit and the electric circuit are detected by the device for detecting faults and stored in a fault memory.

8. The engine control unit as recited in claim 1, wherein the fourth unit includes the low-side output stage component.

9. The engine control unit as recited in claim 4, wherein the microcontroller for controlling the at least one third switch provides detection of faults of the fourth unit.

10. The engine control unit as recited in claim 1, wherein the connecting of the electric circuit by the third unit is to the first switch.

11. The engine control unit as recited in claim 10, wherein the engine control unit is configured for the first switch to provide the voltage from the second unit to the electric circuit via the third unit responsive to the presence on the line of the combination of both the first signal and the second signal, the voltage not being provided by the first switch to the electric circuit when either of the first signal and the second signal is not present on the line.

12. The engine control unit as recited in claim 11, wherein the first and second signals are lead from the first and fourth units, respectively, to a connection point on the line and the first switch is downstream from the connection point.

13. The engine control unit as recited in claim 12, further comprising a third switch and a fourth switch, wherein the engine control unit is configured for:

the third switch to close in response to ignition activation;

the voltage to, when the third switch is closed, (a) pass through the third switch in order for the first unit to be able to provide the voltage as the first signal, and (b) close the fourth switch in order for the second unit to be able to provide the voltage to the first switch.

14. The engine control unit as recited in claim 1, wherein the cooperation of the first and second signals is by the arrangement of the engine control unit to logically combine the first and second signals such that the first switch is switched on to provide the voltage to the electric circuit only if the first and second signals are both active.

15. A method for controlling an electric circuit of a starter in a vehicle using an engine control unit having a first switch, the method comprising:

providing, by a first circuit unit, a first signal in the form of an ignition signal;

providing, by a second circuit unit, a second signal which is generated indirectly from the first signal;

forming a virtual second switch based on a combination of the first signal and the second signal; and controlling the first switch by the virtual second switch for selectively turning the electric circuit on or off with the aid of the first switch;

wherein:

the first switch is disposed between (a) a third circuit unit for connecting the electric circuit and (b) a fourth circuit unit that is configured to provide voltage for the electric circuit; and at least one of:

(i) the fourth unit includes a low-side output stage component;

(ii) the method comprises connecting, by the third circuit unit, the electric circuit by the third unit is to the first switch, and the engine control unit is configured for the first switch to provide the voltage from the fourth circuit unit to the electric circuit via the third circuit unit responsive to the presence on a line of a combination of both the first signal and the second signal, the voltage not being provided by the first switch to the electric circuit when either of the first signal and the second signal is not present on the line; and (iii) the combination of the first and second signals is by an arrangement of the engine control unit to logically combine the first and second signals such that the first switch is switched on to provide the voltage to the electric circuit only if the first and second signals are both active.

16. A control unit for determining a fault in an electric circuit of a vehicle, the control unit comprising:

a first switch including:

(i) an input node configured to receive a voltage;

(ii) an output node configured for powering the electric circuit with the voltage;

(iii) a control node configured for receiving a signal based on an ignition; and (iv) a first diagnostic line;

a second switch including a second diagnostic line and configured to connect the output node of the first switch to the electric circuit according to a second control node receiving a control signal; and a microcontroller configured to provide the control signal to the second switch and configured to receive: (i) a signal from the first diagnostic line to diagnose a fault in the first switch and (ii) a signal from the second diagnostic line to diagnose a fault in the second switch.

17. The engine control unit as recited in claim 16, wherein the microcontroller is configured to diagnose the fault in the first switch by comparing the received signal from the first diagnostic line to a first threshold value and to diagnose the fault in the second switch by comparing the received signal from the second diagnostic line to a second threshold value.

18. The engine control unit as recited in claim 16, wherein, after the vehicle is started, the microcontroller is configured to provide an OFF control signal to the second switch to diagnose the fault in the first switch.

* * * * *